INVENTORS
NORBERT J. ARMSTRONG
WILLIAM R. WENTZ
BY
ATTORNEY

னand
United States Patent Office 3,148,585
Patented Sept. 15, 1964

3,148,585
AUTOMATIC APPARATUS FOR FILM PRINTERS
Norbert J. Armstrong, Berwyn, and William R. Wentz, Warminster, Pa., assignors to the United States of America as represented by the Secretary of the Navy
Filed Nov. 27, 1961, Ser. No. 155,216
6 Claims. (Cl. 88—24)
(Granted under Title 35, U.S. Code (1952), sec. 266)

The invention described herein may be manufactured and used by or for the Government of the United States of America for governmental purposes without the payment of any royalties thereon or therefor.

The present invention relates to film printers and more particularly to an apparatus for automatically printing rolls of film.

Rapid printing of exposed rolled film of the non-perforated, 4½ x 4½ inch size, commonly used in aerial photography is highly desirable. A roll of this type of film may contain hundreds of individual negatives, each one of which may be essential to an integrated overall picture. Needless to say, in many situations, for example in military operations, rapid and accurate printing of the rolled film is essential.

Thus, some automatic means for transporting this type of rolled film through a printing apparatus and stopping each negative exactly centered between the plates of a printer long enough to print the negative is a basic requirement. However, the format or negative areas on the rolled film are in general erratically spaced. Therefore, the length of film which must be transported for each individual frame is much too variable to accommodate a purely mechanical method of advancing the film from frame to frame through the printer.

Present day methods of advancing the rolled film through the printer are non-automatic. In other words, an operator is required to center individual negatives within the printing area. This must be done for each negative on the roll of film. Consequently, printing a roll of this type of film is slow and tedious and oftentimes, due to the human element, the negative or format area on the film is inaccurately aligned within the printer.

The present invention contemplates an apparatus which transports the film through the printer and automatically stops the film in the printer each time that a format or negative area on the film is accurately positioned within the printer. The present invention contemplates an automatic film drive for use with a printer which takes into account the erratic spacing between negative areas on the film and is highly accurate and dependable.

As is well known, the areas on rolled film which separate negatives thereon are characterized in that they are practically transparent. The difference between densities of the format area and the spacings therebetween is electronically detectable.

The present invention provides an electronically controlled apparatus for automatically transporting through a printer individual negatives on a roll of 4½ x 4½ inch format exposed film. As the film is transported through the printer, an electronic light sensitive scanner meters the film. When the scanner detects the area of low density which is the spacing between negatives on the film, it automatically energizes a time delay relay. After a predetermined time, the time delay relay is actuated and causes the movement of the film to be stopped. Because the length of the format or negative area is constant, the distance the film has to travel to be exactly centered within the printer after the low density area is detected is easily ascertainable and the time delay relay is accordingly set.

In other words, the scanner detects the place on the roll of film at which a negative area ends at which time the scanner causes a time delay relay to be energized which allows the film to continue on a little further through the printer until the negative area is correctly positioned between the plates of a printer.

Therefore, it is an object of the present invention to provide an apparatus for automatically transporting a roll of film negative by negative through a printer.

It is another object of the present invention to provide an electronically controlled apparatus for automatically and accurately positioning individual negatives on a roll of film within a printer through which the film is passed.

A further object of the present invention is to provide an electronically controlled apparatus for automatically advancing film frame by frame through a printer, accurately positioning erratically spaced negatives on a roll of film to provide a completely automatic printing operation.

Still another object of the present invention is to provide a system for rapidly, accurately, and automatically advancing a roll of film negative by negative through a printer wherein the film is automatically stopped when the negative is exactly centered within the printer.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
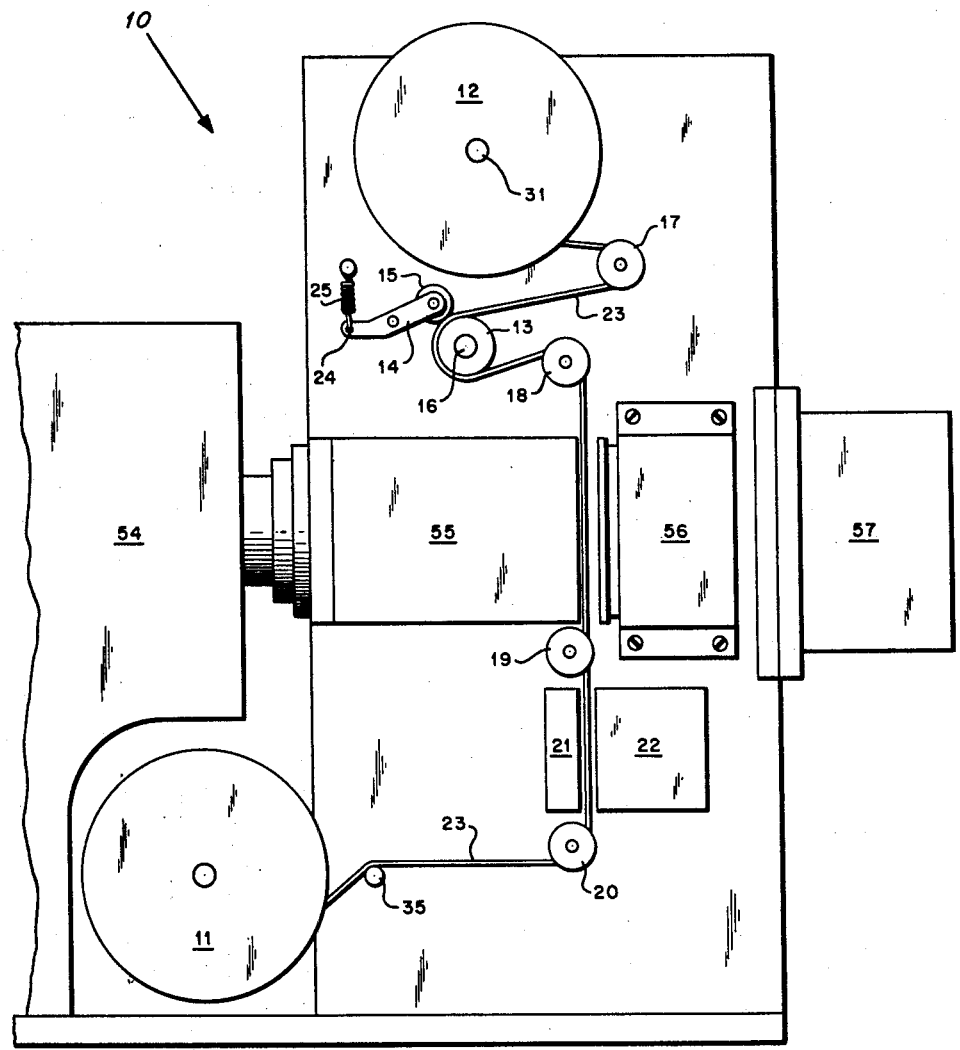
FIG. 1 shows the construction of a printer apparatus embodying the principle of the present invention.

Referring now to FIG. 1, there is shown apparatus 10 showing the arrangement of the printer with respect to the automatic film transport mechanism. A supply reel 11 carries the roll of film to be printed. The film 23 is fed through the printing area between the light condenser 55 and the lens block 56 of a conventional film printer as shown. Light source 54 and printing assembly 57 are provided as are well known. Drive roller 13 is driven by a shaft 16 which is driven at a constant speed, more fully described hereinafter. Arm 14 which is pivotally mounted about point 24 has a friction roller 15 at one end which is gently biased against roller 13 by means of a spring 25. Drive roller 13 and friction roller 15 act together to pull the film from supply reel 11 through the printer. Take-up reel 12 which is driven by the same motor which drives drive roller 13 rewinds the film. It is noted that take-up reel 12 is driven from the shaft 16 by means of a 100 percent slip pulley or cine belt so that when the motor is disengaged from shaft 16 and the film stops, the take-up reel 12 merely maintains the tension in the film and in no way imparts motion to the film. The film 23 is positioned and guided through the printer by a series of rollers or idlers 17, 18, 19 and 20 and guide roller 35.

Positioned between idlers 19 and 20 is a light box 21 comprising an array of lights which transverse the width of the film. On the other side of the film adjacent the light box is a photo transistor sensor 22 comprising an array of photo transistors which transverse the width of the film and which is better seen in FIG. 2. The light box 21 and sensor 22 together act as a film scanner for precisely locating the negatives on the film 23 as it is drawn through the printer from supply reel 11 by means of drive roller 13 and friction roller 15.

When the end of a negative area passes between light box 21 and sensor 22, a time delay relay is energized.

After a time which is determined by the time it takes the film negative to be accurately centered within the printer after having passed the scanner, the power to drive roller 16 is cut off and the negative is printed. After printing of the negative is accomplished, power to shaft 16 is automatically turned on and the process is repeated for the next negative on the film 23. The actual printing process and printer per se form no part of this invention and only that part of the structure of a conventional printer is shown which is necessary to completely describe the present invention.

Figure 2:
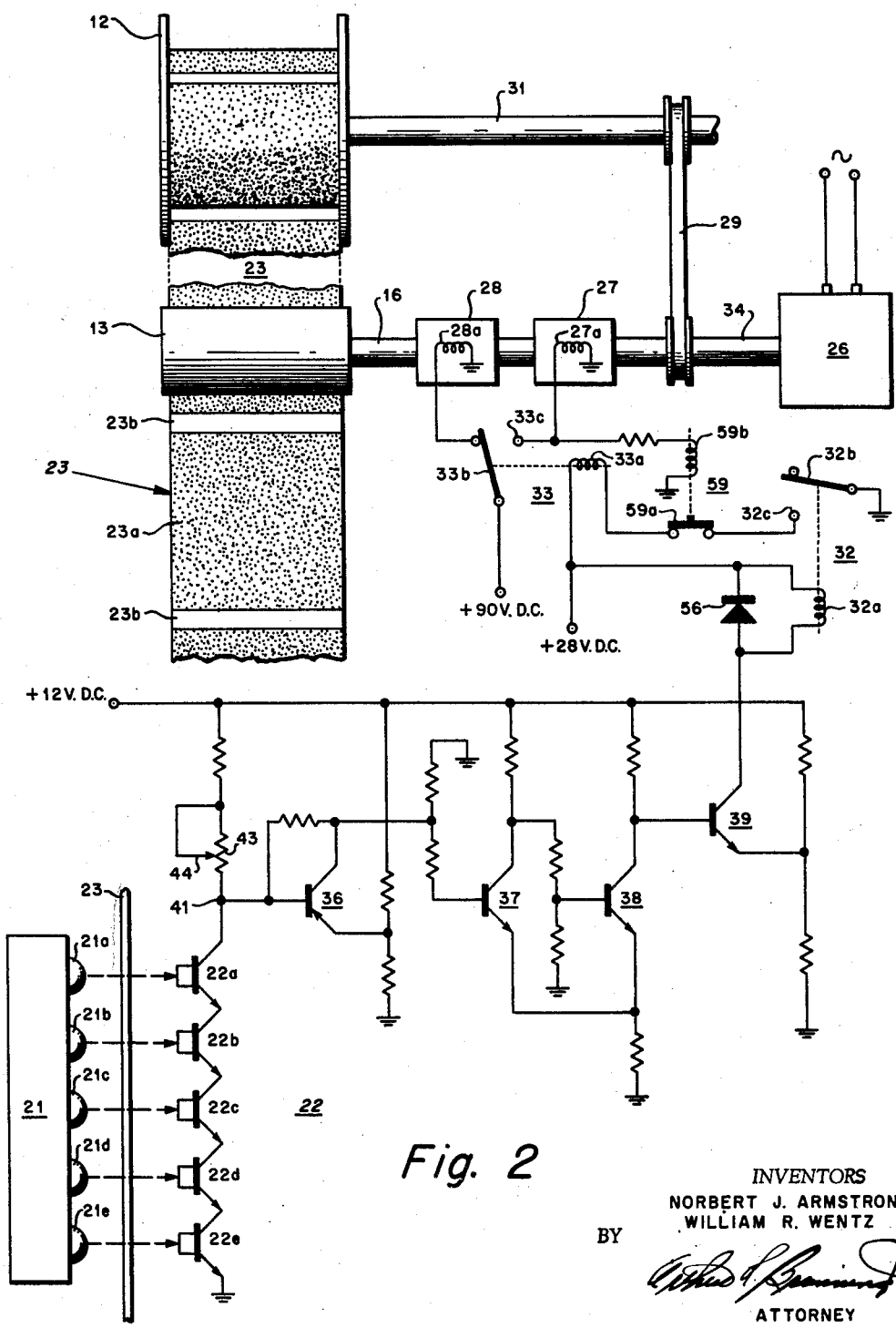
FIG. 2 illustrates partly in schematic and partly in block diagram form the preferred embodiment of the present invention.

Referring now to FIG. 2, there is shown partly in schematic and partly in block diagram form the various elements of the combination embodying the principle of the present invention.

Motor 26 has a shaft 34 which is connected to the shaft 16 of drive roller 13 through clutch box 27 and brake box 28. Shaft 34 is connected via cine belt 29 to shaft 31 of take-up reel 12. When motor 26 is energized, shaft 16 drives roller 13 through the clutch box 27 and the brake box 28 at a constant speed. The clutch of clutch box 27 is normally in an engaged position while the brake of brake box 28 is normally energized to a held out position. Motor 26 also drives take-in reel 12 via slip pulley or cine belt 29 and shaft 31. As drive roller 13 advances the film through the printer, the film is wound on reel 12. Pulley belt 29 is designed to slip when clutch 27 is energized to remove power from drive roller 13. Thus, reel 12 functions as a take-up reel and maintains a minimum tension on the film after the drive roller 13 has stopped.

FIG. 2 shows the sensor element as being composed of five photo transistors 22a through 22e. Light box 21 comprises five light bulbs 21a to 21e with each photo transistor arranged to receive the light from its respective bulb. As the film 23 advances through the printer, photo transistors 22a through 22e detect the point on the film where a negative area 23a ends and the relatively small clear or transparent area 23b begins. When sensor 22 detects this, relay 32 is energized in a manner to be more fully explained hereinbelow by energization of coil 32a. When coil 32a is energized, switch arm 32b makes contact 32c to thereby energize coil 33a of time delay relay 33. After a predetermined time, which is the time it takes the negative area 23a to be exactly positioned within the printer after sensor element 22 has detected the end of the negative area 23a, switch arm 33b makes contact 33c thereby energizing the solenoid coil 27a of clutch 27 which causes motor shaft 34 to decouple from drive roller shaft 16. Actuation of switch 33b also causes time delay relay 59 to be energized. At the same time the 90 volt source of D.C. having been removed from circuit with brake solenoid 28a, the brake grabs shaft 16 which assures immediate stoppage of drive roller 13.

After a predetermined time, which is the time it takes to complete the printing process on one negative, time delay relay 59 is actuated and causes switch arm 59a to break the circuit to coil 33a. Relay 33 is thus deenergized. When this occurs, drive roller 13 commences to move the film through the printer for another cycle, motor shaft 34 is again coupled to drive roller shaft 16 and the brake is held off. As soon as the format area or negative area interposes between the light box 21 and the sensor 22, relay 32 is deenergized and the system is completely reset and prepared for stopping the next negative for printing within the printer. Time delay relays are well known in the art and the details thereof have not been shown as the details form no part of the present invention. These relays may be electromagnetic as shown by Hovey, Patent No. 1,922,089, or electronic as shown by Rehahn, Patent No. 2,901,606.

The circuit for relay 32 is composed of four transistors 36, 37, 38 and 39. Transistor 36 is normally non-conducting but when the potential at point 41 is lowered and when the photo transistors 22a through 22e are made conductive, transistor 36 is turned on. This occurs when a clear area between negative areas on the film is interposed between light source 21 and sensor 22. The voltage at which transistor 36 is biased off may be varied by moving slide arm 44 with respect to resistor 43. Thus, the sensitivity of sensor 22 is adjustable.

Transistor 37, which is normally non-conducting, is turned on as a result of the voltage drop on its base when transistor 36 is turned on. When transistor 37 is turned on, the voltage at the base of transistor 38 is decreased to a point which cuts off conduction of transistor 38. When transistor 38 ceases to conduct, the voltage on the base of transistor 39 rises with respect to the voltage on the emitter of transistor 39 to cause transistor 39 to become conductive to connect the 28-volt source of D.C. potential to ground through coil 32a of relay 32. Relay 32 is then actuated and closes switch arm 22b, which as pointed out hereinabove, causes time delay relay 33 to be energized.

The time it takes a negative area to become centered within the printer after sensor 22 has detected the passage of the end of a negative area is easily ascertainable and the time delay relay 33 may be set accordingly. Also the time that each negative is held stopped within the printer may be controlled by the time delay of time delay relay 59.

Obviously many modifications and variations of the present invention are possible in the light of the above teachings. It is therefore to be understood, that within the scope of the appended claims, the invention may be practiced otherwise than as specifically described.

What is claimed is:

1. An apparatus for automatically stopping and centering within a printer each negative on a roll of exposed film for printing thereof, comprising in combination:

drive means for continuously transporting the film through the printer;

sensor means comprising a plurality of light sensitive conductors in a band across the width of said film positioned adjacent said film for detecting the end of a passing negative area on said film;

said sensor means including first circuit means for providing an output voltage in response to the passage of the end of a film negative area; and first time delay relay means connected between said drive means and said circuit means and energized by said output voltage for stopping the film a predetermined time after the occurrence of said output voltage;

whereby the negative areas on said film are individually stopped and positioned within the printer for the printing interval.

2. An apparatus as recited in claim 1 further comprising:

second circuit means including second time delay relay means connected to said first circuit means and said drive means for restarting the drive means a predetermined time after said drive means is stopped.

3. An apparatus as recited in claim 1 wherein said drive means comprises:

a film supply reel;

a take-up reel for receiving film from said supply reel;

idler pulley means for positioning said film parallelly between the plates of a printer; and drive roller means adapted to frictionally engage said film for transporting said film from said supply reel to said take-up reel through the plates of a printer; and said apparatus further comprising motor means, clutch means, and shaft means coupling said motor means to said drive roller means through said clutch means.

4. An apparatus as recited in claim 3 wherein said clutch means normally couples said motor means to said drive roller means for continuously driving said drive roller means.

5. An apparatus as recited in claim 2 wherein said drive means comprises:
   drive roller means adapted to frictionally engage said film for transporting said film through the plates of a printer; motor means; and
   clutch means normally coupling said motor means to said drive roller means for continuously driving said drive roller means.

6. An apparatus as recited in claim 5 wherein said second circuit means has means for recoupling said drive shaft means to said drive roller means and removing said braking force from said drive roller means a predetermined time after said decoupling occurs.

References Cited in the file of this patent

UNITED STATES PATENTS

| | | |
|---|---|---|
| 2,594,358 | Shaw | Apr. 29, 1952 |
| 2,947,217 | McWhirter | Aug. 2, 1960 |